(12) United States Patent
Groves et al.

(10) Patent No.: US 8,465,247 B2
(45) Date of Patent: Jun. 18, 2013

(54) AIRCRAFT LANDING GEAR LOADER

(75) Inventors: Oliver J. Groves, Freeland, WA (US);
Gary F. Heilman, Everett, WA (US);
Charles D. Harrison, Arlington, WA (US); Bart M. Taylor, Arlington, WA (US); Se Y. Chun, Edmonds, WA (US);
Tae H. Kim, Maple Valley, WA (US);
Gregory Koyfman, Newcastle, WA (US); Edward D. Oare, Everett, WA (US); Jacob D. Virnig, Woodinville, WA (US); Michael H. Konen, Marysville, WA (US)

(73) Assignee: The Boeing Company, Chicago, IL (US)

( * ) Notice: Subject to any disclaimer, the term of this patent is extended or adjusted under 35 U.S.C. 154(b) by 835 days.

(21) Appl. No.: 12/615,214

(22) Filed: Nov. 9, 2009

(65) Prior Publication Data

US 2010/0119343 A1  May 13, 2010

Related U.S. Application Data

(63) Continuation-in-part of application No. 11/274,036, filed on Nov. 15, 2005, now abandoned.

(51) Int. Cl.
*B64F 5/00* (2006.01)
(52) U.S. Cl.
CPC ................................ *B64F 5/0036* (2013.01)

USPC .......................................................... 414/589
(58) Field of Classification Search
USPC ........................ 414/590, 589; 254/89 R, 7 R
See application file for complete search history.

(56) References Cited

U.S. PATENT DOCUMENTS

| 4,950,126 A | | 8/1990 | Fabiano et al. |
| 5,460,474 A | * | 10/1995 | Iles .............................. 414/590 |
| 6,390,762 B1 | | 5/2002 | Peery et al. |
| 6,485,247 B1 | | 11/2002 | Groves et al. |

FOREIGN PATENT DOCUMENTS

| EP | 1 378 448 A1 | 1/2004 |
| FR | 2 848 528 A1 | 6/2004 |
| JP | 3 211195 A | 9/1991 |

* cited by examiner

*Primary Examiner* — Dean Kramer
*Assistant Examiner* — Brendan Tighe
(74) *Attorney, Agent, or Firm* — Haynes and Boone, LLP

(57) ABSTRACT

An apparatus for loading and unloading a main landing gear ("MLG") of an aircraft includes a fixture that is adapted to couple to a truck of the MLG such that a sagittal plane of the fixture is parallel to or coplanar with a sagittal plane of the MLG and both translational forces and turning moments applied to the fixture are coupled directly through the fixture to the MLG, a mechanism for controllably translating the fixture in the sagittal plane thereof, and a mechanism for controllably rotating the fixture in the sagittal plane thereof.

23 Claims, 13 Drawing Sheets

AIRCRAFT LANDING GEAR LOADER

RELATED APPLICATIONS

This application is a continuation-in-part of U.S. application Ser. No. 11/274,036, filed Nov. 15, 2005.

TECHNICAL FIELD

This disclosure pertains to mechanisms for lifting and manipulating heavy objects in general, and more particularly, to a loader for the main landing gear of a large aircraft.

BACKGROUND

Modern large aircraft, such as the Boeing 777, are typically assembled on a moving assembly line. Moving line assembly requires that the aircraft's main landing gear (MLG), each of which may weigh more 14,000 lbs., be installed while the weight of the aircraft is supported on jacks, with the belly of its fuselage disposed 106 inches or more above the floor. Moreover, repairs or maintenance of large aircraft in the field often must be effected in an actual "flight line" environment, necessitating the removal and installation of large MLG at heights of up to 154 inches above the tarmac, and additionally, in a potentially more hazardous environment, e.g., an Underwriters Laboratories ("UL") "Class 1, Division 1" (fueled aircraft) environment.

The prior art methods for installing large MLG are typically accomplished on the flight line or in a customer's hangar. Several examples of specialized apparatus adapted for effecting such heavy equipment lifts and manipulations can be found in the patent art, e.g., in U.S. Pat. Nos. 5,460,474 to L. E. Iles; 6,390,762 to W J. Peery et al.; and, 6,485,247 to O. J. Groves et al.

One such prior art method and associated apparatus are those developed for loading the MLG of the Boeing 747 aircraft. However, it should be noted that the 747 MLG loader is not capable of supporting the increased weight of the larger MLG of more recent aircraft, e.g., the Boeing 777, and is therefore incapable of installing the 777 MLG in either a moving line or a flight line environment. This prior art MLG loader comprises three separate towers having associated floor plates that are installed concentrically to the MLG. The equipment necessitates that all six MLG wheels be removed from their respective axels, and that at least three protective sleeves be installed on the bare axels, two on the outboard side and one at the opposite inboard side on the center axle. The protective sleeves are in turn attached to three, six-ton lever chain hoists located on respective ones of the three towers. The lever chain hoists are attached to the plates and respective hoist chains are attached between the tower and the MLG, each of which are then independently tensioned or relaxed in the desired direction to align the upper end of the strut of the MLG into position with and inside of the wheel well of the aircraft.

The foregoing sequence must be accomplished prior to either the installation or the removal of a MLG from an aircraft, and in either case, the aircraft must first be fully supported on jacks, scaffolds or other supports. The disadvantage of the prior art method and apparatus is that they take substantial setup time and manual labor, including disassembly of the MLG wheels and the manual manipulation of the MLG with multiple, independent lever chain hoists, and with the subsequent need to reassemble three of the six wheels on the gear and disassemble the equipment after the MLG has been installed.

Accordingly, there is a long-felt but as yet unsatisfied need in the industry for a loader that can install a large MLG into or remove it from an aircraft in either a moving line or a flight line environment in a controllable, safe, accurate, reliable manner, and in a substantially reduced amount of time.

BRIEF SUMMARY

In accordance with the exemplary embodiments thereof described herein, the present disclosure provides a method and apparatus for loading the MLG of a large aircraft into or from the wheel wells of the aircraft in either a moving assembly line or a flight line environment in a safer, more reliable and accurate manner, and in a substantially reduced amount of time than those of the prior art.

In one advantageous embodiment, an apparatus for loading and unloading a MLG of an aircraft comprises a fixture that is adapted to couple to a truck of the MLG such that a sagittal plane of the fixture is disposed parallel to or coplanar with a sagittal plane of the MLG and both translational forces and turning moments applied to the fixture are coupled directly through the fixture to the MLG, a mechanism for controllably translating the fixture in the sagittal plane thereof, and a mechanism for controllably rotating the fixture in the sagittal plane thereof.

In another embodiment, a method for loading a MLG of an aircraft includes coupling a fixture to a truck of the MLG such that both translational forces and turning moments applied to the fixture are coupled through the fixture directly to the MLG, controllably translating the fixture in at least one of a horizontal plane and a sagittal plane of the MLG until an upper end of a strut of the MLG is aligned with a wheel well of the aircraft, and controllably rotating the fixture in at least one of the sagittal plane and a horizontal plane until the upper end of the strut is disposed within the wheel well.

A better understanding of the above and many other features and advantages of the methods and apparatus of the MLG loader of the present disclosure may be obtained from a consideration of the detailed description of the exemplary embodiments thereof below, particularly if such consideration is made in conjunction with the appended drawings, wherein like reference numerals are used to identify like elements illustrated in one or more of the figures therein.

DETAILED DESCRIPTION

Figure 1:
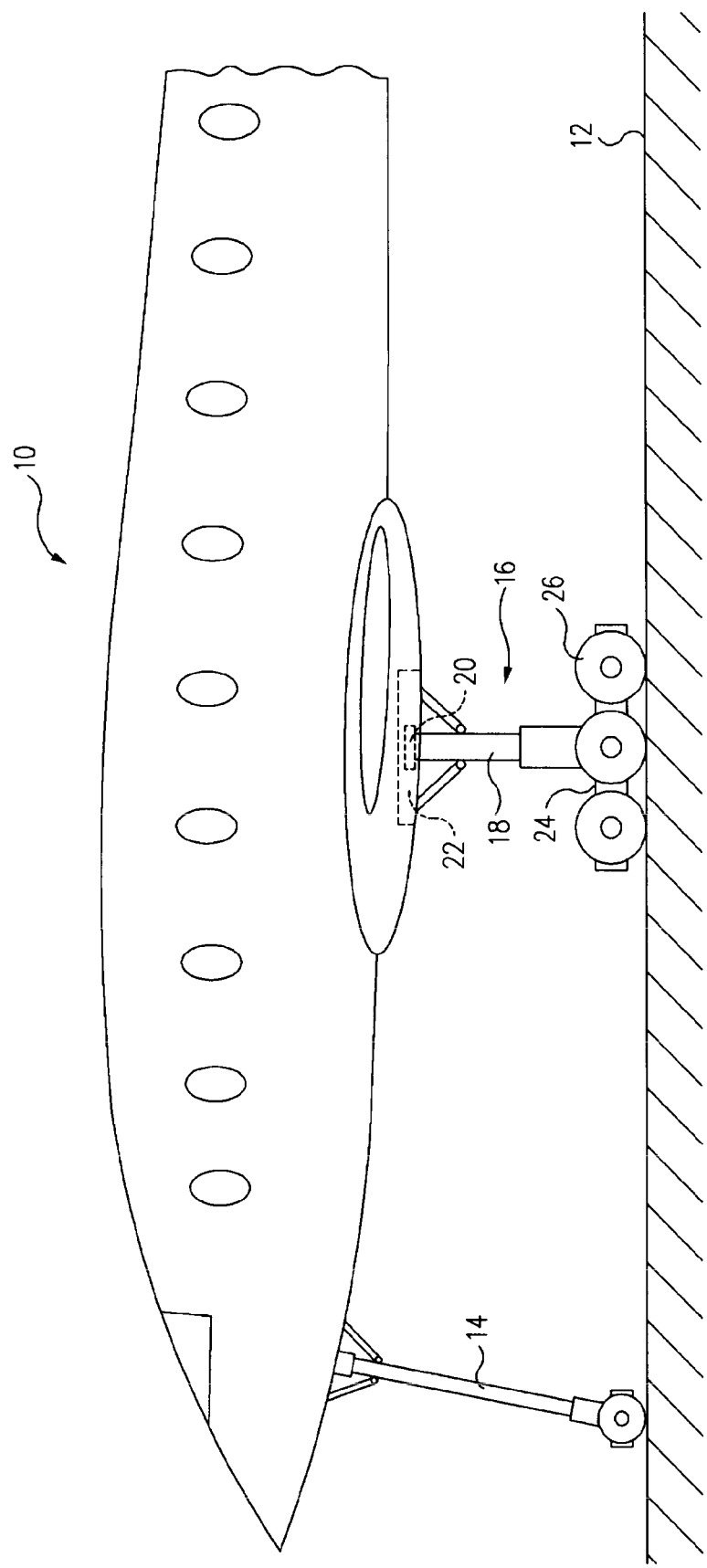
FIG. 1 is a partial left side elevation view of a large aircraft situated on a horizontal surface, such as a hangar floor or tarmac and supported by a nose gear and a left main landing gear ("MLG")

FIG. 1 is a left side partial elevation view of a large aircraft 10 situated on a generally horizontal surface, such as a hangar floor or tarmac 12, and supported thereon by a nose gear 14 and a left main landing gear ("MLG") 16 of the aircraft. In the particular embodiment of aircraft 10 and MLG 16 illustrated, the MLG comprises an elongated strut 18 having an upper end 20 extending into a wheel well 22 of the aircraft, where it is coupled to associated structure adapted to support the aircraft on the MLG and to extend the MLG from and retract it completely into the wheel well during takeoff, flight and landing operations. The MLG 16 typically further includes a truck 24 having a plurality of wheels 26 rotatably mounted thereon. In a typical embodiment, the MLG 16 may include six wheels, can weigh more than 7 tons, and measure more than 154 inches in length.

Figure 2:
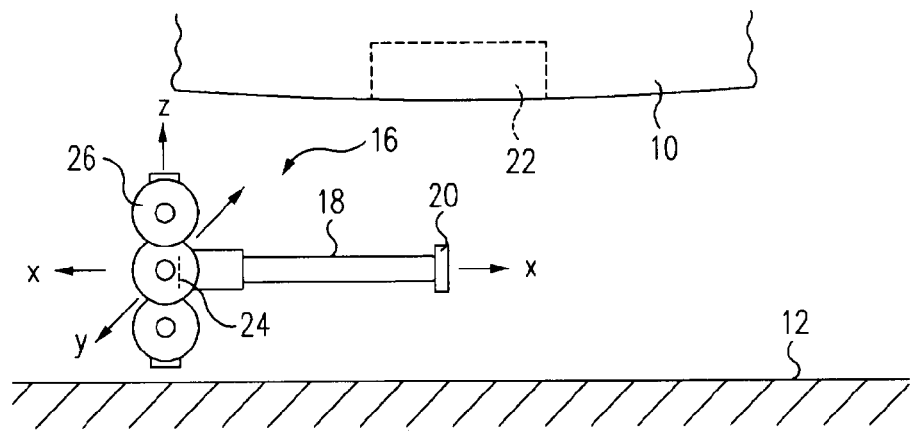
FIG. 2 is a partial schematic elevation view of the aircraft and MLG of FIG. 1, showing a strut of the MLG disposed in a generally horizontal orientation and aligned with a wheel well of the aircraft, preparatory to being loaded into the wheel well.
Figure 3:
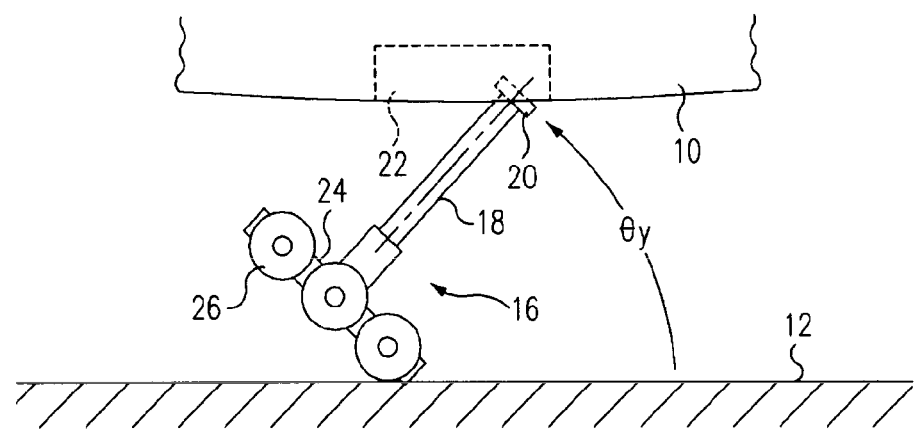
FIG. 3 is a view similar to FIG. 2, showing the MLG rotated through an angle $\Theta_y$ in a sagittal plane of the MLG.
Figure 4:
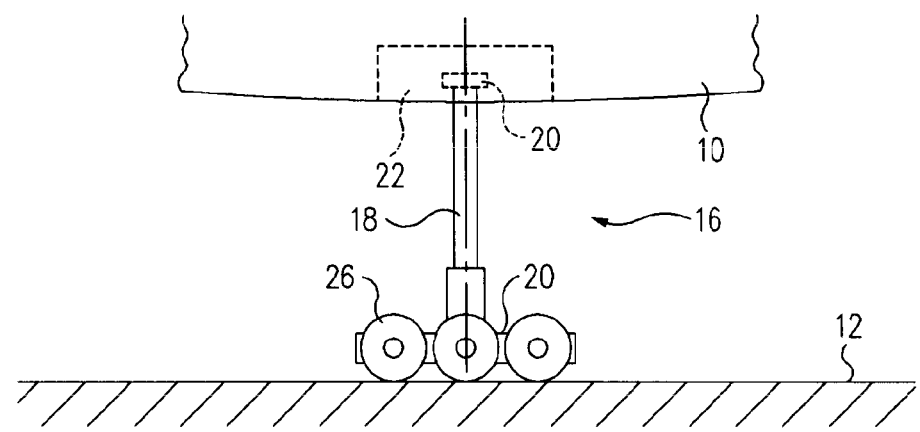
FIG. 4 is a view similar to FIGS. 2 and 3, showing the MLG in a generally upright, loaded position, with an upper end of the strut of the MLG disposed in the wheel well of the aircraft.

FIGS. 2-4 schematically illustrate the sequential steps involved in one method of loading, i.e., installing, the MLG 16 into the aircraft 10, and in particular, the insertion of the upper end 20 of the elongated strut 18 thereof into the wheel well 22 of the aircraft, wherein it should be understood that during the entire procedure, the weight of the aircraft 10 is supported on a plurality of jacks, scaffolds or other supporting mechanisms (not illustrated), and that the procedure for unloading, or uninstalling the MLG 16 involves a reversal of the procedural steps illustrated. As shown in FIG. 2, the loading procedure begins with the strut 18 of the MLG 16 disposed generally horizontally and the truck 24 disposed generally vertically, with the strut aligned with the wheel well 22 both longitudinally, i.e., along the x axis shown, and transversely, i.e., along the y-axis, such that a sagittal plane extends commonly through both the MLG 16 and the wheel well 22.

In FIG. 3, the MLG 16 is shown having been rotated in the sagittal plane of the MLG through an angular displacement $\Theta_y$, such that the upper end 20 of the MLG strut 18 is partially disposed in the wheel well 22 of the aircraft 10, and in FIG. 4, the MLG is shown fully rotated to a substantially upright orientation, in which the upper end 20 of the strut 18 can be coupled to associated MLG structure (not illustrated) within the wheel well 22. Thus, it will be appreciated that, to effect the foregoing procedures effectively in connection with a relatively large, heavy MLG 16, a MLG loader must be capable of first grasping and holding the MLG securely and reliably, and then manipulating it controllably, safely, and accurately in at least four degrees of movement, i.e., along three orthogonal axes of translation, two horizontal (i.e., "x," or fore-and-aft, and "y," or transverse) and one vertical (i.e., "z"), and in at least one degree of rotational movement within the sagittal plane of the MLG (i.e., "$\Theta_y$").

Figure 5A:
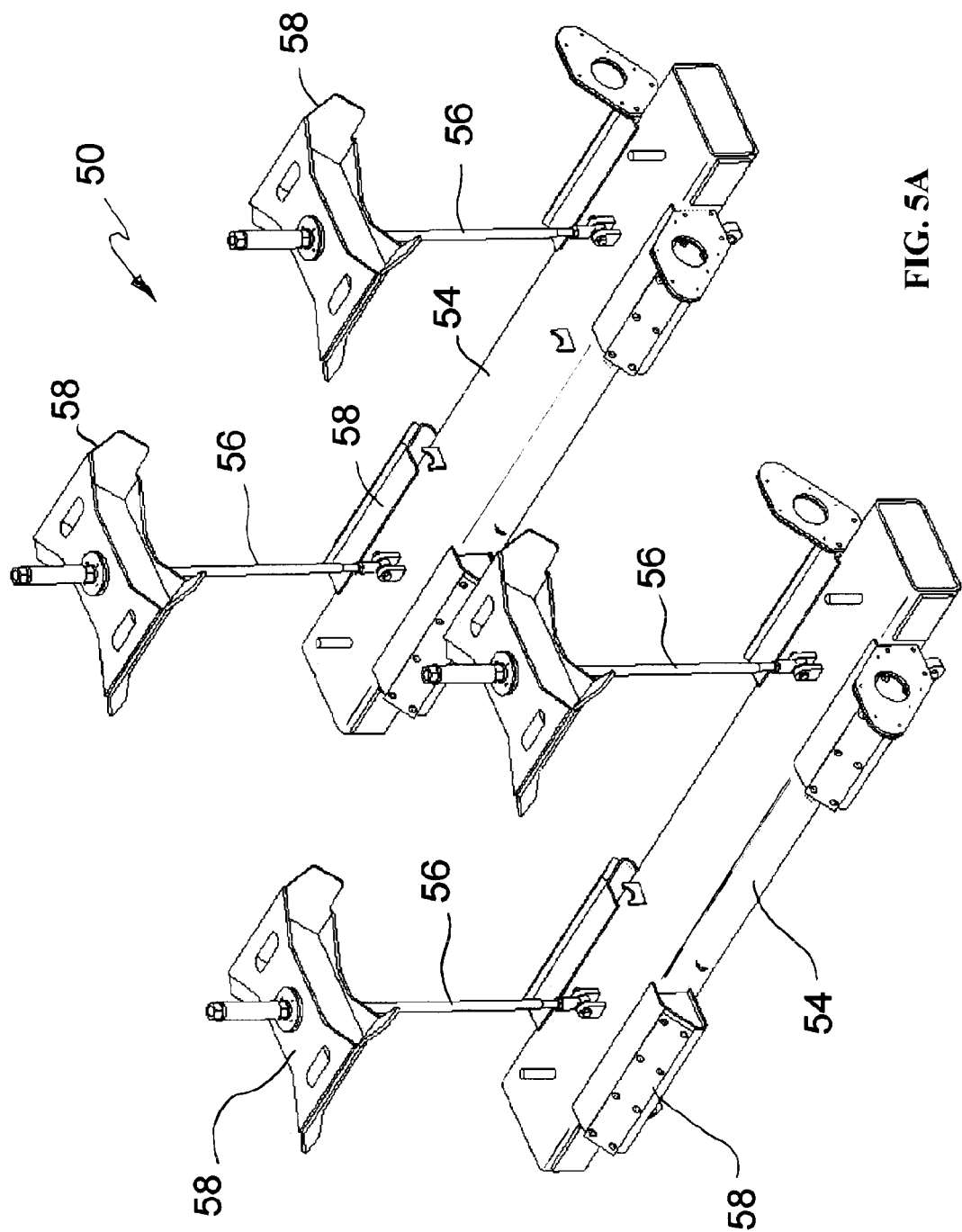
FIG. 5A is a perspective view of an example embodiment of a MLG coupling fixture used by an exemplary embodiment of a MLG loader in accordance with the present disclosure to apply both axial and turning forces to the MLG.
Figure 5B:
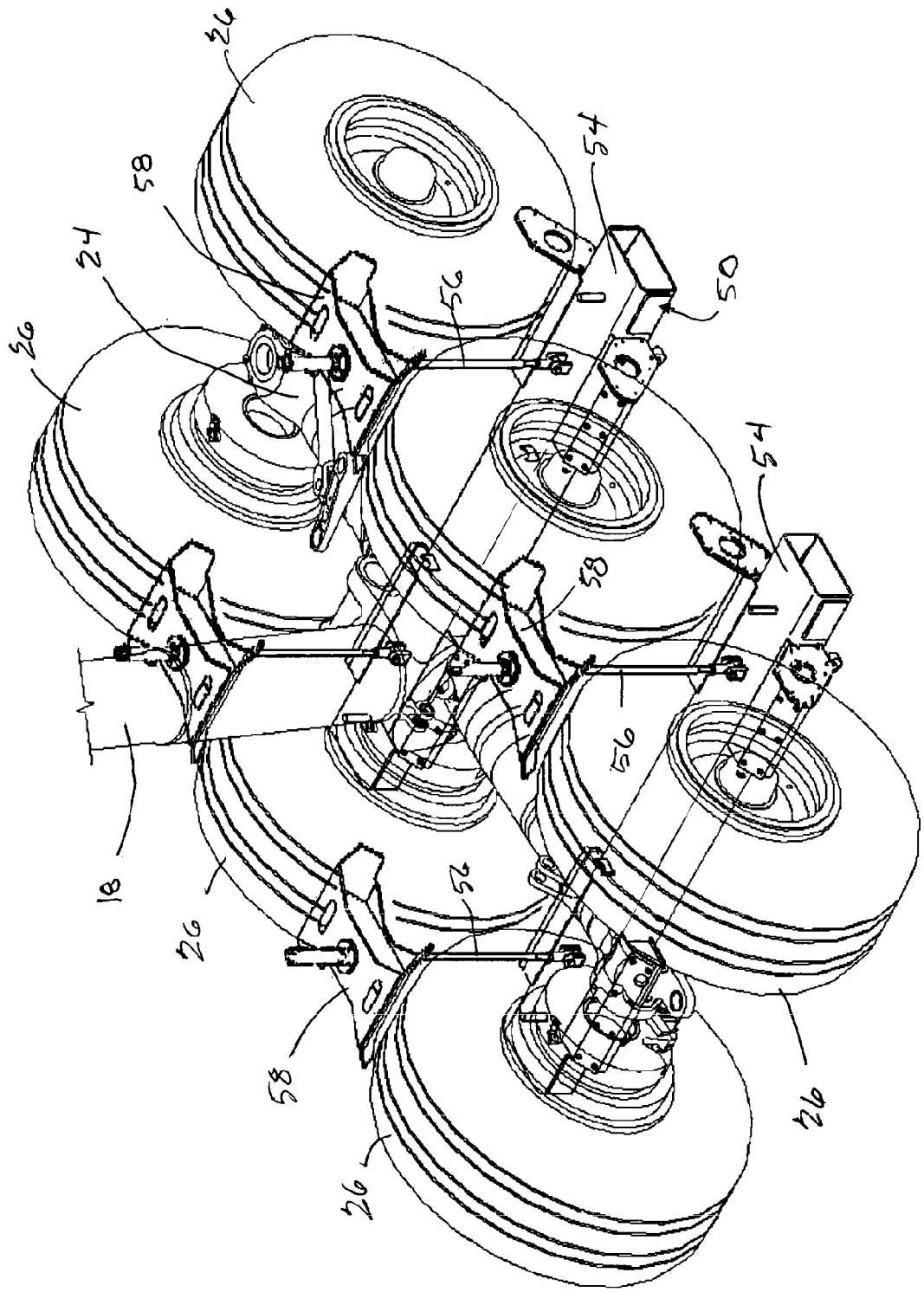
FIG. 5B is a perspective view of the coupling fixture of FIG. 5A, showing the fixture attached to the truck and wheels of a MLG.

An example embodiment of an advantageous tool or fixture 50 for grasping and holding the MLG 16 for such manipulation by a loader in accordance with the present disclosure is illustrated in the perspective view of FIG. 5A, and comprises a "shipping" fixture that couples to the tires on the wheels 26 of the truck 24 of the MLG. As illustrated in FIGS. 5A and 5B, the fixture 50 comprises a pair of transverse fork-lift tubes or beams 54. Each of four vertical rods 56 is slidably moveable on the transverse beams 54 and mounts a pair of spaced-apart, adjustable spatulate fingers 58 adapted to engage and resiliently clamp onto the aft end of the front, or leading pair of the tires of the truck 24, both the leading and aft ends of the middle pair of tires, and the leading ends of the aft or rearmost pair of tires of the truck 24, in a strong, clamping attachment, as illustrated in FIG. 5B. Because the center of gravity (C.G.) of the MLG 16 is located close to the truck 24 of the MLG, the fixture 50 provides a convenient means for lifting and transporting the MLG, e.g., by means of a forklift, over moderate distances, and since it is capable of coupling both translational forces and turning moments to the MLG 16, is also well suited for use by a loader in accordance with the present disclosure in effecting the above-described types of translations and rotations of the MLG 16.

Figure 5C:
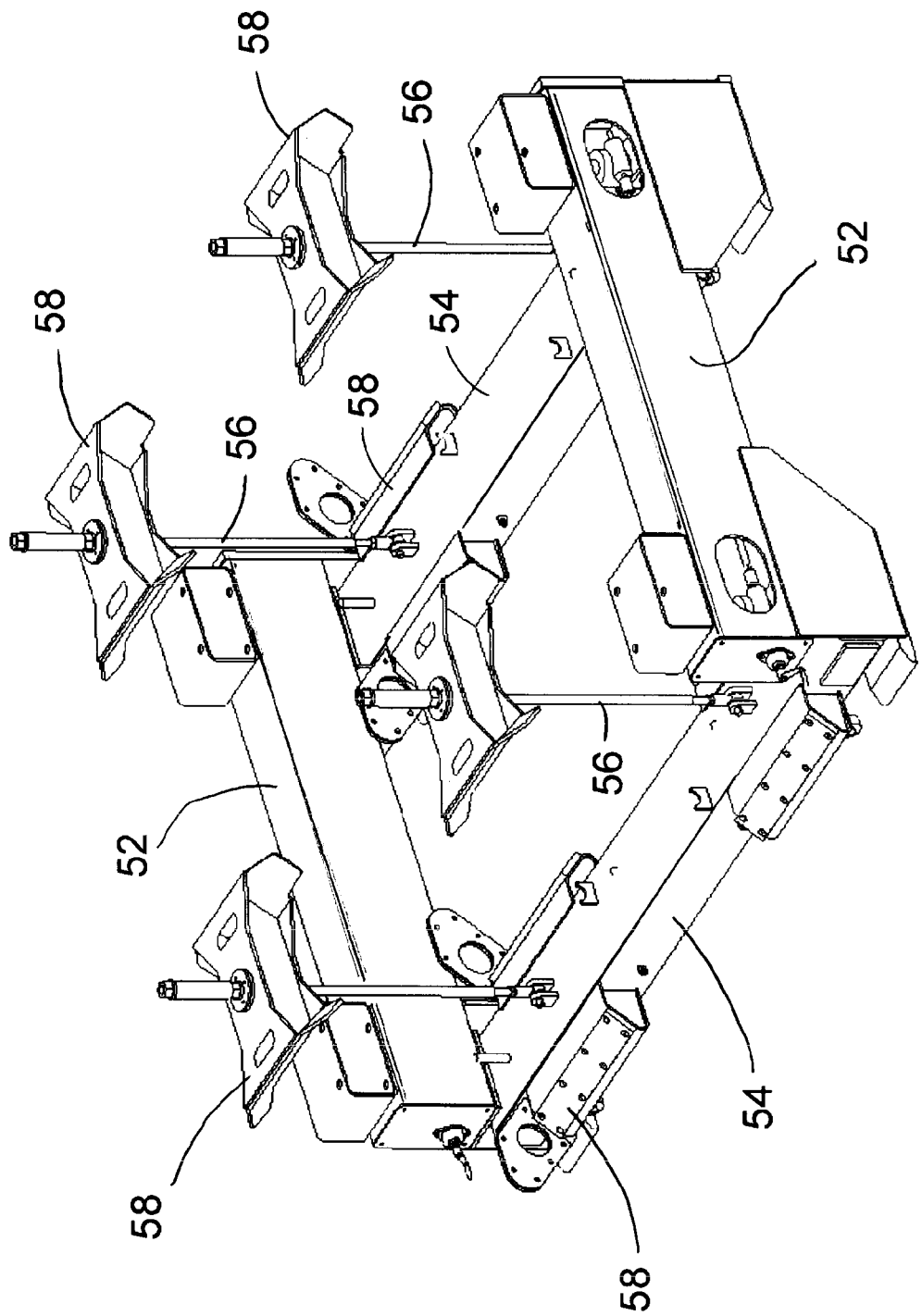
FIG. 5C is another perspective view of the example coupling fixture of FIG. 5A, showing a pair of elongated couplers of the example MLG loader respectively attached to opposite side ends of the fixture.

FIG. 5C is another perspective view of the example coupling fixture 50 of FIG. 5A in which the MLG 16 is omitted, showing a pair of elongated couplers 52 of the example MLG loader 60 described below respectively attached over opposite side ends of the fixture. As discussed in more detail below, each of the elongated couplers 52 incorporates a pair of C-shaped mouths 53 in which a respective one of the ends of the transverse beams 54 of the fixture 50 are received (see FIG. 6). The couplers 52 are respectively attached to each of a pair associated slide mechanisms 76 of the MLG loader 60 for manipulation of the coupling fixture 50, and hence, the MLG 16, both translationally in the fore and aft, or "x" direction, and rotationally in the sagittal plane of the MLG, i.e., in the $\Theta_y$ direction.

Figure 6:
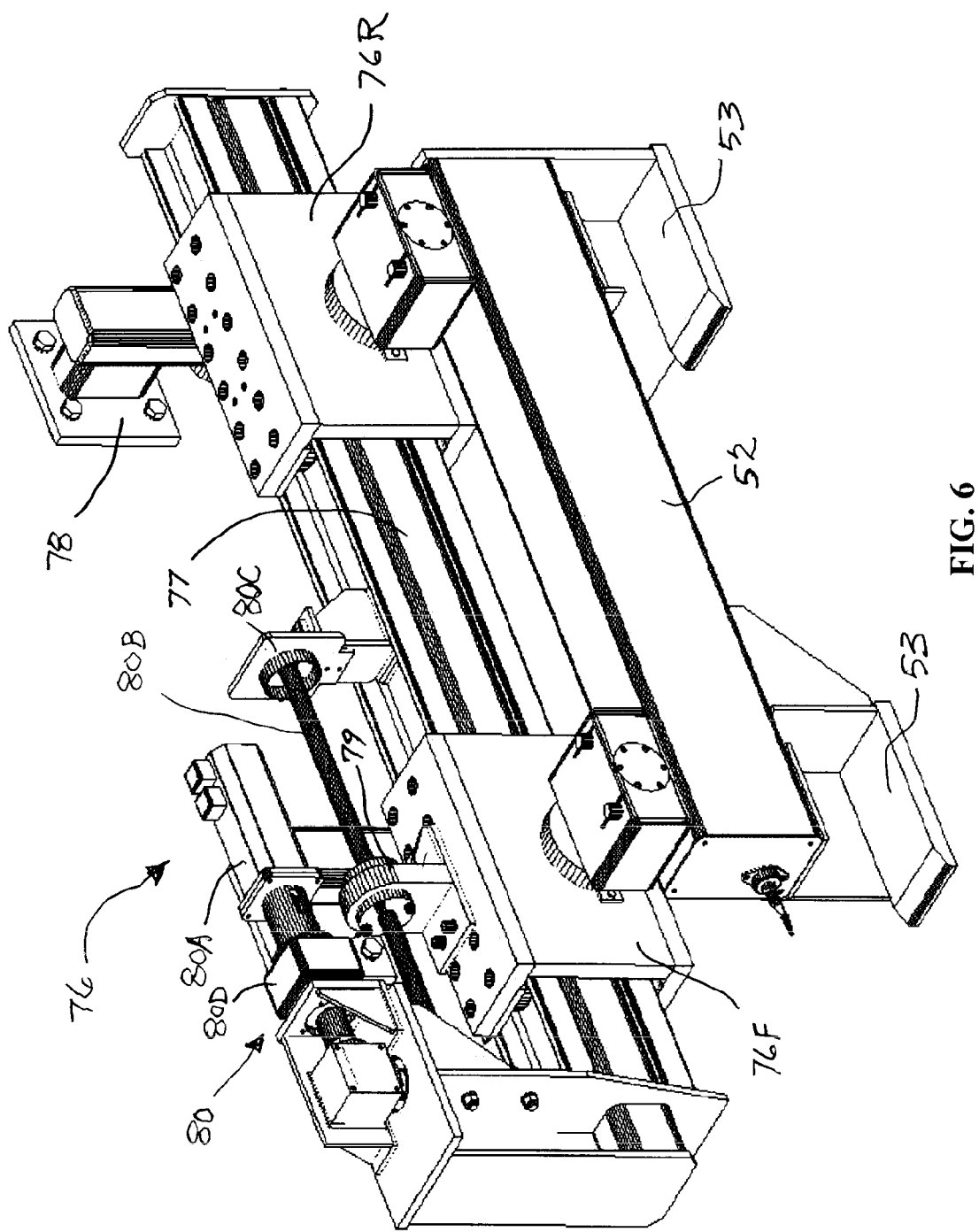
FIG. 6 is a front and upper left side perspective view of an example embodiment of a slide mechanism of the example MLG loader.
Figure 7:
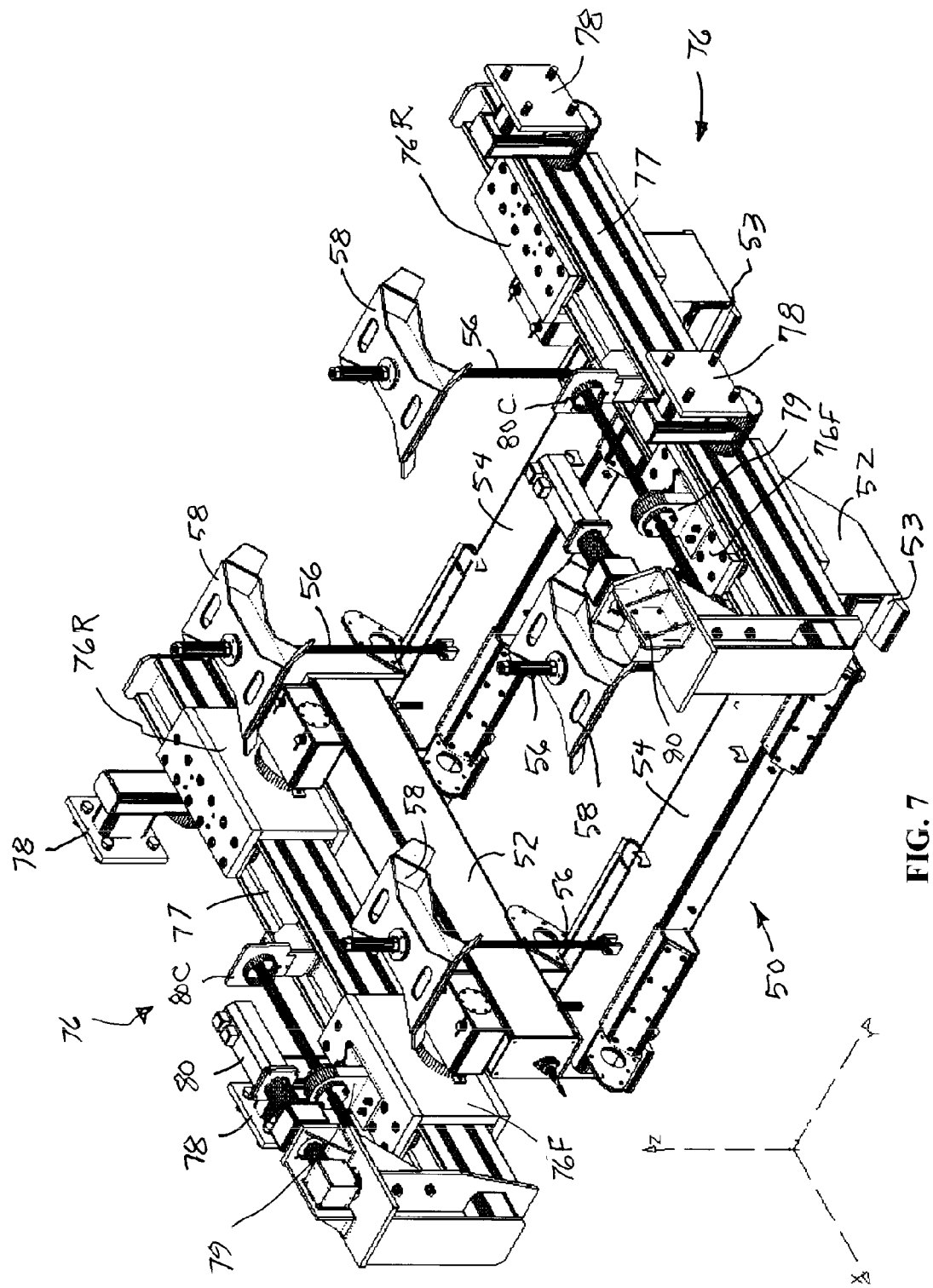
FIG. 7 is a front and upper left side perspective view of two slide mechanisms of the example MLG loader of the present disclosure, showing the respective elongated couplers of the slide mechanisms respectively coupled over opposite side ends of the coupling fixture.

FIG. 6 is a front and upper left side perspective view of an example embodiment of a right side one of the two slide mechanisms 76 of the example MLG loader 60 of the present disclosure, and FIG. 7 is a front and upper left side perspective view of the two slide mechanisms 76 of the loader, showing the C-shaped mouths 53 of the respective elongated couplers 52 of the slide mechanisms 76 respectively attached over opposite side ends of the transverse beams 54 of the coupling fixture 50, as illustrated in FIG. 5C. As may be seen in the figures, the slide mechanisms 76, described in more detail below, are adapted to engage and couple to the coupling fixture 50 from either the opposite sides of the fixture, or from the front or rear end thereof.

Figure 8:
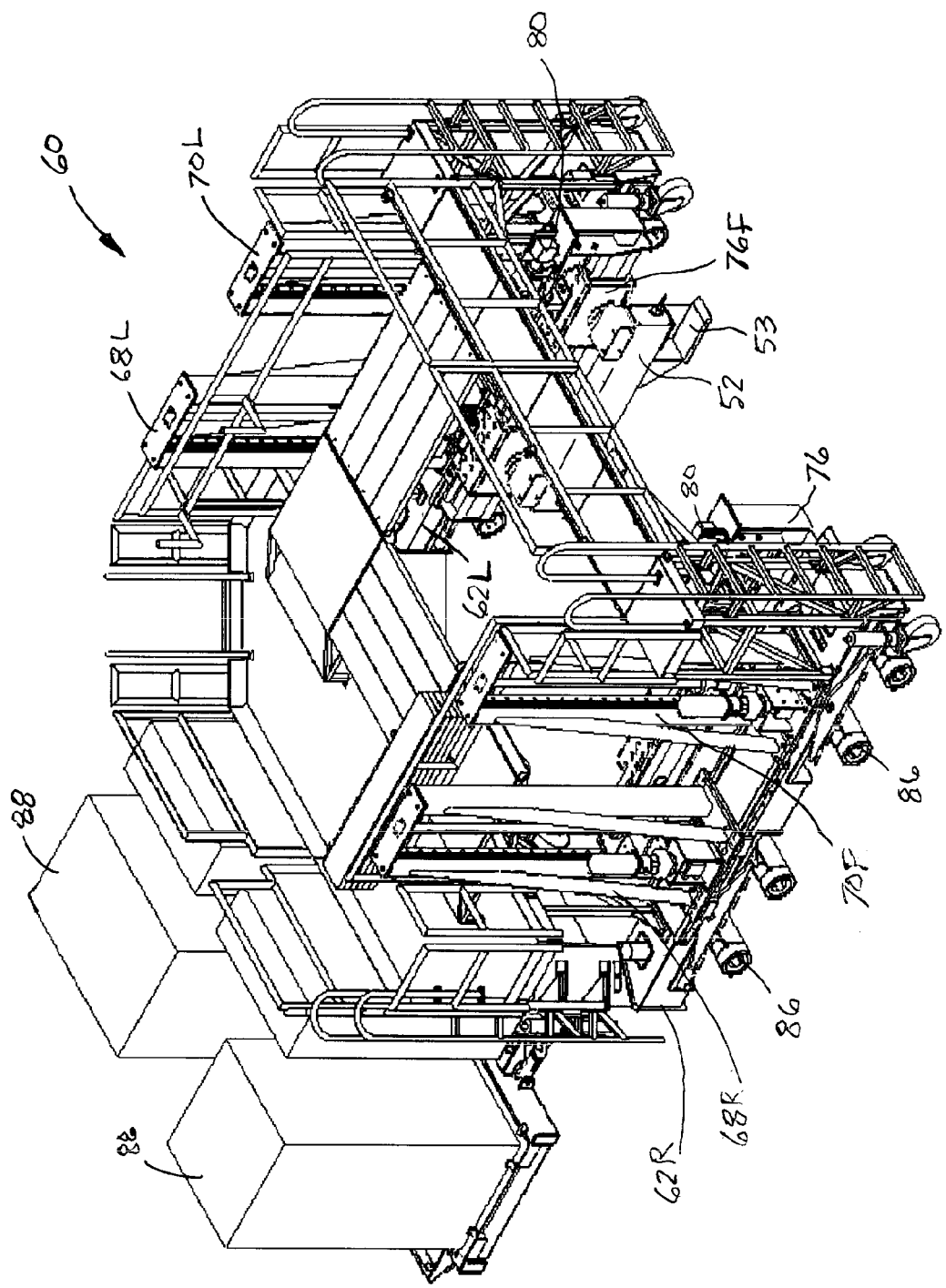
FIG. 8 is a front and upper right side perspective view of an example embodiment of a MLG loader in accordance with the present disclosure, showing symmetrical right- and left-hand portions thereof coupled to each other across a sagittal plane of the MLG, with the coupling fixture and the MLG omitted for clarity of illustration.

An example embodiment of a MLG loader 60 in accordance with the present disclosure is illustrated in the perspective view of FIG. 8, and comprises two generally symmetrical L-shaped "half-units," viz., a left-hand half-unit 62L and a right-hand half-unit 62R, which are respectively disposed on opposite sides of the sagittal plane of the MLG 16 (omitted for clarity of illustration). The half-units 62L and 62R are coupled to each other and the coupling fixture 50 across the generally coplanar sagittal planes (dashed line in FIG. 10) of the MLG 16 and loader 60 via two sets of alignment pins 64 (see FIG. 9) located at their respective centers to form a single, generally U-shaped apparatus that engages the MLG 16 through the agency of the coupling fixture 50 for the lifting and manipulation of the MLG in the above-mentioned four degrees of movement.

Figure 9:
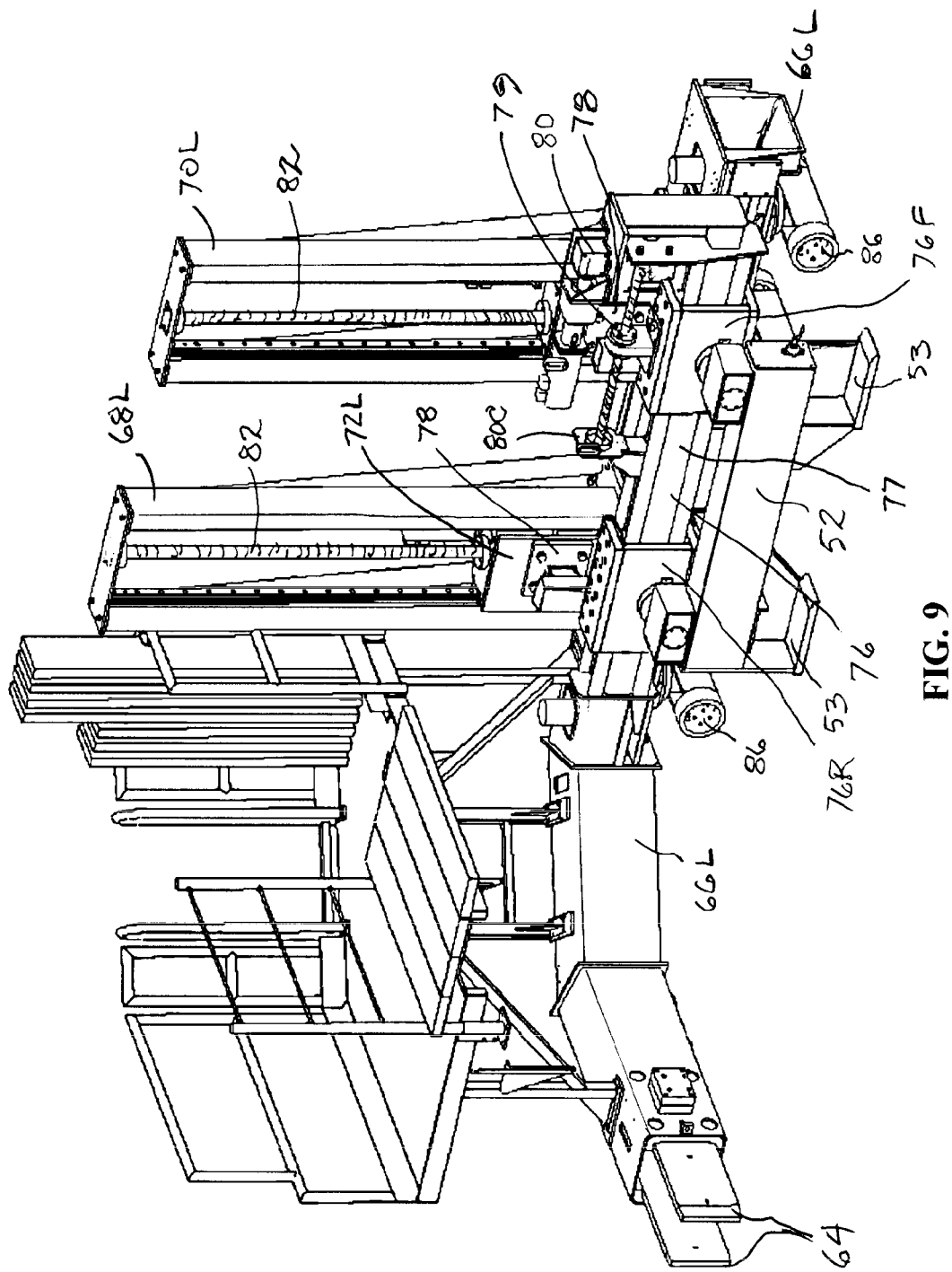
FIG. 9 is a perspective view of a left side half-portion of the exemplary MLG loader of FIG. 8, wherein the right side of the loader and portions of the surrounding scaffolding have been omitted for clarity of illustration.

As illustrated in FIG. 9 (showing only the left-hand L-shaped half-unit 62L), the bilateral half-units 62L and 62R of the loader 60 each comprises a rigid, L-shaped, tubular support frame 66L or 66R, one of a laterally opposing first or rear pair of vertical jacks 68L and 68R slidably mounted on a corresponding one of the opposing support frame portions, and one of a second or front pair of laterally opposing vertical jacks 70L and 70R that is fixedly mounted on the corresponding support frame side portion such that the first or rear pair of jacks 68L, 68R is movable on the support frame in the x, or fore-and-aft direction, toward and away from the fixed second or front pair of jacks 70L, 70R. Each of the jacks has a base end supported on the support frame 66L or 66R and, as shown in, e.g., FIG. 10, a respective opposite, vertically extendible output end 72L, 72R and 74L, 74R. Each of the two slide mechanisms 76 of the loader 60 is attached to a corresponding one of the L-shaped loader half-units 62L and 62R, and in turn, engages the coupling fixture 50 via a corresponding one of the elongated couplers 52 on a corresponding opposite side thereof, as illustrated in FIGS. 5C, 6 and 7. The left and right slide mechanisms 76 cooperate with each other and the coupling fixture 50 to define a single, translatable and rotatable platform that enables the loader 60 to manipulate the MLG 16, both in translation and rotation in the sagittal plane of the MLG, as indicated by the dashed line of FIG. 10, and relative to the support frame 66L and 66R, i.e., in the x, z and $\Theta_y$ directions, respectively, in the following manner.

Figure 10:
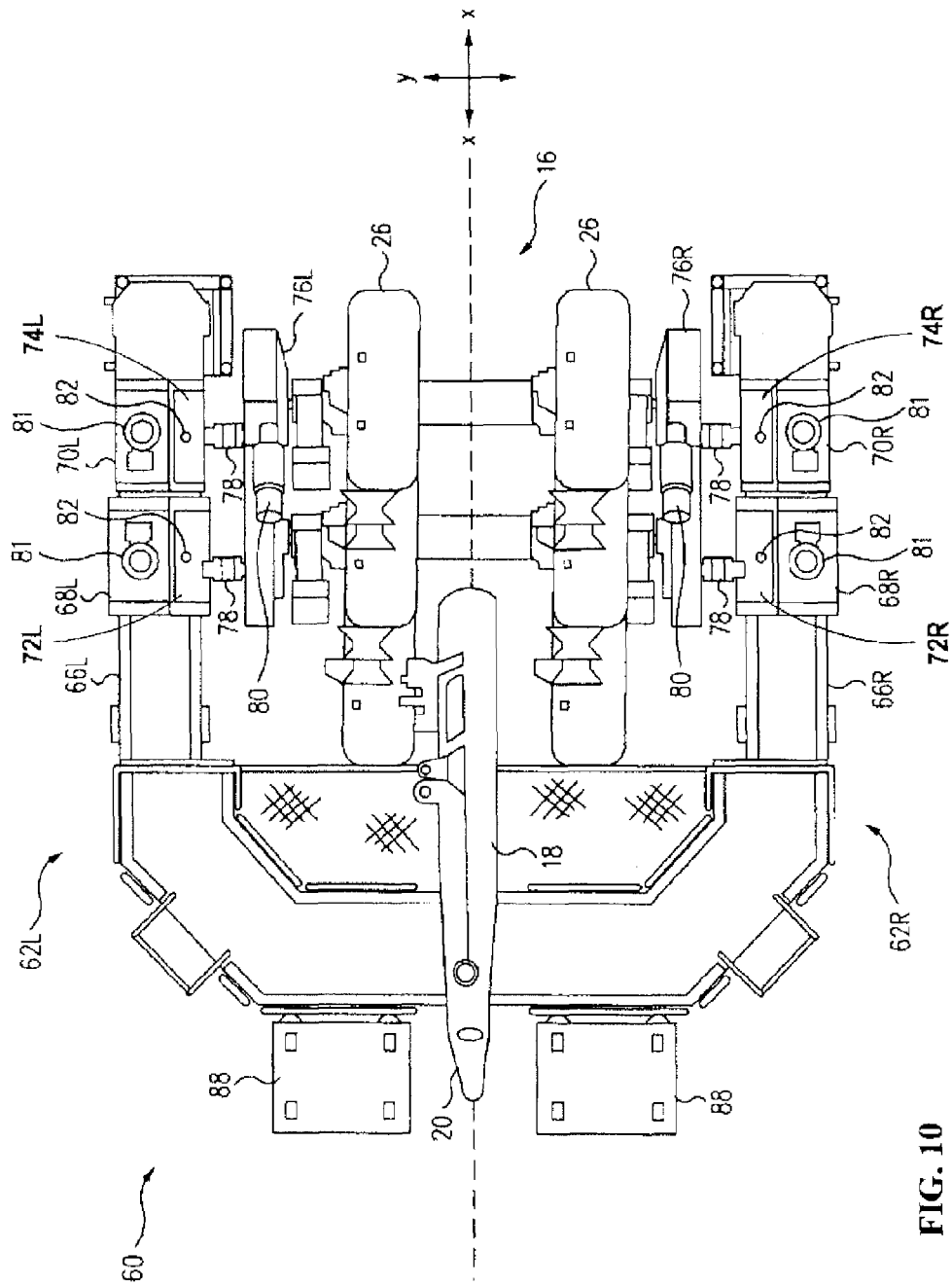
FIG. 10 is a top plan view of the exemplary loader of FIG. 6, showing the MLG disposed between the slide mechanisms of the loader, and wherein the coupling fixture and surrounding work platforms have been omitted for clarity of illustration.
Figure 11:
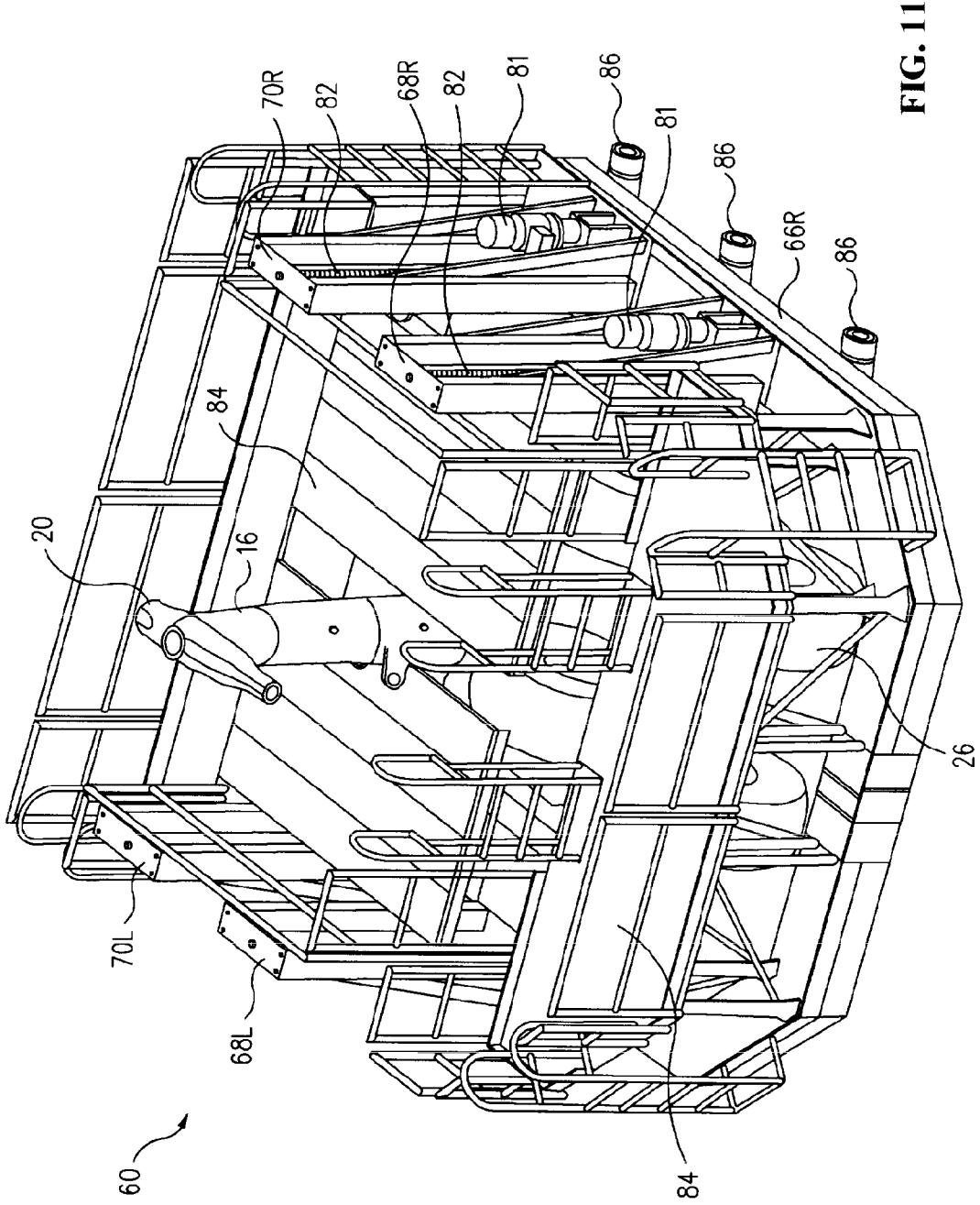
FIG. 11 is a rear upper right side perspective view of the exemplary MLG loader, showing the MLG rotated in the coplanar sagittal planes of the MLG and the loader to a nearly upright position by the loader, and with an elevated work platform of the loader surrounding an upper portion of the strut of the MLG.

As illustrated in, e.g., FIGS. 7, 9 and 10, respective, opposite rear and front sliding members 76R and 76F of each of the slide mechanisms 76 of each L-shaped half-unit 62L and 62R is disposed for sliding movement on a corresponding horizontal rail 77, which in turn, is rotatably coupled to a lower end of a corresponding one of a pair of Z-shaped foot-blocks 78. The opposite, upper ends of the corresponding foot-blocks 78 are each coupled to a corresponding one of the output ends 72L, 72R, 74L, 74R of the corresponding jacks 68L, 68R, 70L, 70R. The sliding members 76R and 76F of each slide mechanism 76 are slidably mounted on rollers (not visible in the figures) in the respective rails 77 for translational movement in a plane parallel to the sagittal plane of the MLG 16 and relative to the respective jacks 68L, 68R, 70L, 70R, as may be required, for example, to clear the lip of the aircraft wheel well 22 or other structures when the MLG 16 is rotated. Thus, the rail 77 and the two corresponding sliding members 76R, 76F of each slide mechanism 76 are capable of both rotation and translation relative to the corresponding jack output end 72L, 72R, 74L, 74R, in the following manner.

As illustrated in FIGS. 6, 7 and 9, the sliding members 76R and 76F of each slide mechanism 76 is positioned for axial movement on the corresponding horizontal rail 77 by means of a 10-ton ball-screw linear actuator 80 driven by a 1.3 horsepower electric motor 80A equipped with a C-face braking mechanism and acting through a recurvate screw drive 80B. The screw of the drive has a distal end that is supported for rotation in a bracket 80C fixed to the rail 77 at about the middle of its length. In the example embodiment illustrated in FIGS. 6 and 7, the electric motor 80A is connected to an inline gear box 80D having a 5:1 gear ratio mounted to a bracket and coupled to the ball-screw actuator 80.

As illustrated in FIGS. 6 and 7, the ball screw nut 79 of the linear actuator 80 is attached to the forward sliding member 76F by means of a bracket, and the respective axial positions of the two front sliding members 76F of each slide mechanism 76 on the corresponding rail 77 thereof are controlled with the corresponding linear actuators 80. The elongated couplers 52 of each slide mechanism 76 are rotatably connected at their opposite front and rear ends to respective ones of the corresponding sliding members 76L and 76R. The rear sliding member 76L of each slide mechanism 76 is thus coupled to the corresponding front sliding member 76F through the elongated coupler 52 to move conjointly therewith, such that the linear positions of both the forward and aft sliding members 76F and 76R on the respective rails 77 are controlled by the electric drive motor 80A of the linear actuator 80. Thus, when the linear actuators 80 drive the primary, or front sliding members 76F of the two slide mechanisms 76 simultaneously, they effect simultaneous translational movement of the aft sliding members 76R, the elongated couplers 52, the coupling fixture 50, and hence, the translational movement of the MLG 16 in the common sagittal planes of the MLG 16 and the loader 60. The respective slide mechanisms 76 of the two L-shaped half-units 62L and 62R thus translate simultaneously and coextensively with each other to translate the MLG 16 in the common sagittal plane of the MLG and the loader 60 and relative to the U-shaped support frame 66, regardless of the rotational position of $\Theta_y$ of the MLG in the sagittal plane, which is controlled by the loader 60 in the following manner. Referring to FIGS. 9-12, in the example embodiment of the loader 60 illustrated, each jack of the two pairs of opposing vertical jacks 68L, 68R, 70L and 70R comprises a 1.3 horsepower electric motor 81 with a C-face brake that attaches to an in-line helical box having a 5:1 gear ratio. The gear box attaches to a miter gear box having a 1:1 gear ratio, which in turn, attaches to a 20 ton ball-screw mechanism 82. The screw nut of each ball-screw mechanism is attached to a corresponding one of the output ends 72L, 72R, 74L, 74R of the corresponding jacks 68L, 68R, 70L, 70R. As described above, each of the output ends 72L, 72R, 74L, 74R of the corresponding jacks 68L, 68R, 70L, 70R is attached to an upper end of a corresponding one of the Z-shaped foot-blocks 78. In one exemplary embodiment, the maximum stroke or extension of the jack ball screw mechanisms, and hence, the respective output ends 72L, 72R, 74L, 74R of the corresponding jacks 68L, 68R, 70L, 70R, is adjusted to about 65 inches. However, the stroke can be extended for use of the loader 60 in, e.g., a flight line environment in which a greater stroke may be required.

Figure 12:
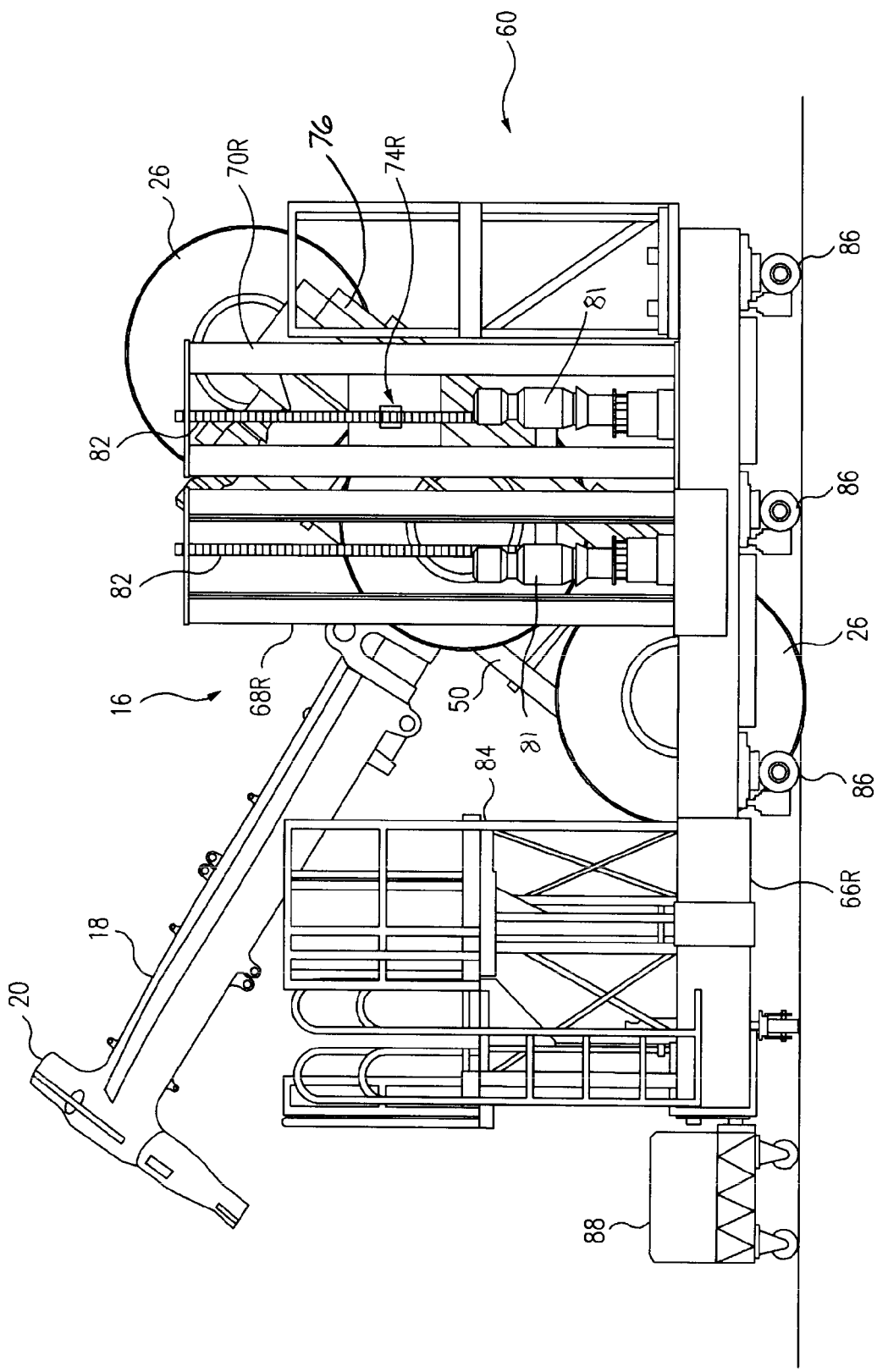
FIG. 12 is a right side elevation of the loader, showing the MLG rotated in the sagittal plane thereof by the loader to an angle of about a 45 degrees relative to the horizontal; and, FIG. 13 is a partial front perspective view of the MLG, showing an optional MLG strut rotating mechanism of the loader.
Figure 13:
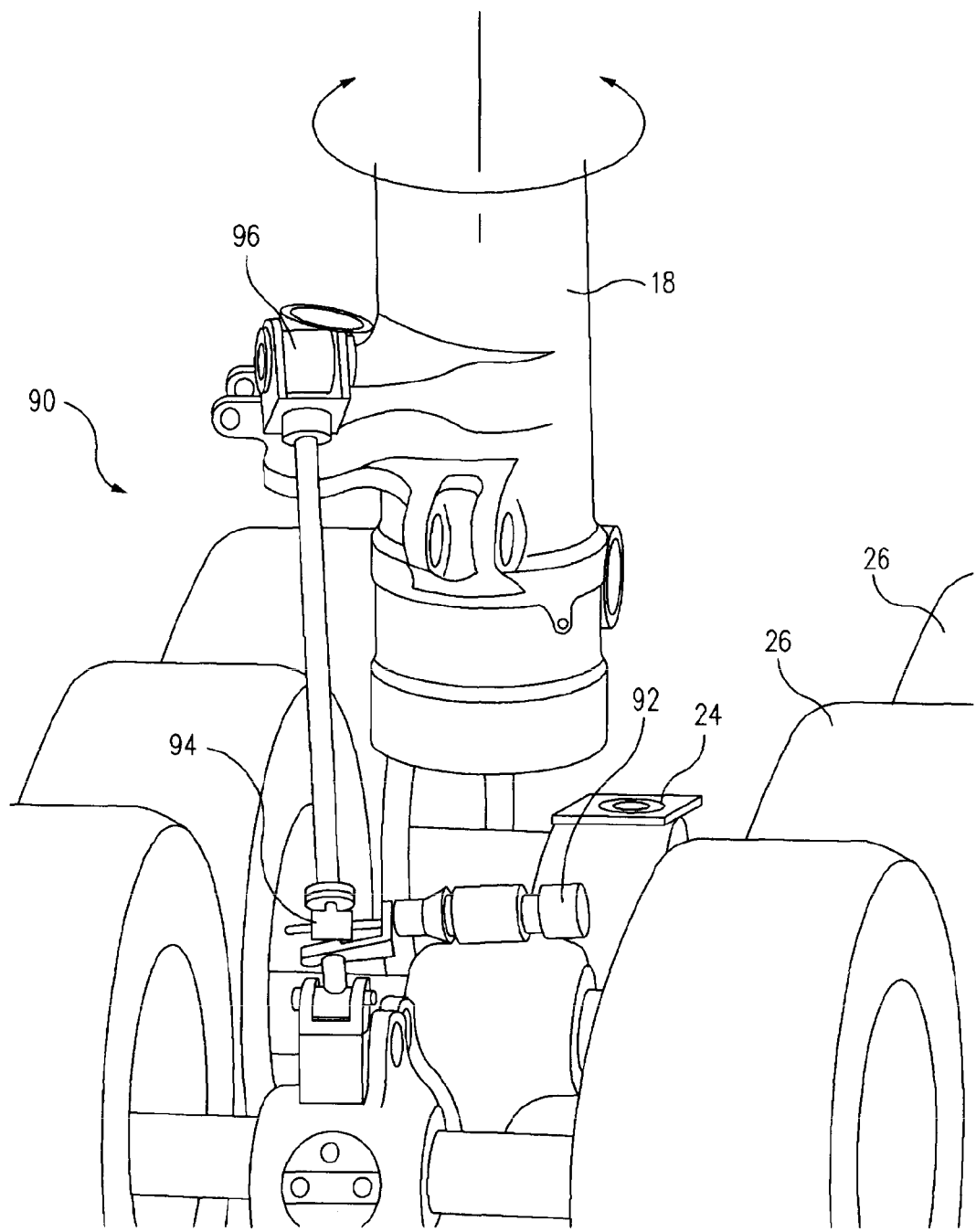

Both the vertical position of the MLG 16, as well as its rotational position $\Theta_y$ in the sagittal plane and relative to the support frame 66, may thus be controlled by the vertical stroke of the four jacks 68L, 68R, 70L, 70R acting in concert, in the case of the vertical position of the MLG 16, or in concerted, opposing pairs, i.e., the front, or forward opposing pair 70L and 70R moving in concert with each other, and/or the aft, or rearward pair 68L and 68R moving in concert with each other and independently of the front pair. Thus, if the MLG 16 is loaded onto the loader 60 with the strut end 20 extending rearward relative to the loader, as illustrated in FIGS. 10 and 12, wherein the upper end of the MLG is shown surrounded on all sides by a plurality of elevated scaffolds, or work platforms 84 of the loader, the strut end 20 can be rotated in a forward direction by simultaneously and coextensively lowering the output ends 74L and 74R of the front opposing pair of jacks 70L and 70R relative to the output ends 72L and 72R of the aft pair of jacks 68L and 68R, and/or by raising the output ends of the aft pair relative to the front pair. On the other hand, if the strut end 20 of the MLG 16 is initially oriented in a forward direction relative to the loader 60 (not illustrated), the strut end can be rotated in a rearward direction by lowering the output ends 72L and 72R of the rearward pair of jacks 68L and 68R in concert and/or by raising the output ends 74L and 74R of the forward pair of jacks 70L and 70R in concert. In either case, as the MLG 16 rotates in the common sagittal plane, the moveable pair of opposing rear jacks 68L and 68R slide axially on the support frame relative to the fixed pair 70L and 70R to accommodate the changing horizontal distance between the respective fore and aft sliding members 76F and 76R of the slide mechanisms 76 as they are rotated in unison by the jacks 68L, 68R, 70L, 70R. The initial MLG 16 orientation selected will depend on whether it is desirable to approach the wheel well 22 of the aircraft 10 with the MLG strut 18 from the front or the aft end of the aircraft 10. The example loader 60 illustrated and described herein is capable of rotating the MLG 16 at an inclination of at least 60 degrees relative to the horizon, with the strut 18 of the MLG 16 initially oriented horizontally, in the aft direction, or to an inclination of 52 degrees, with the MLG strut 18 initially oriented horizontally, in the forward direction. In the preferred embodiment, the latter procedure is typically followed because there are fewer operations involved in the installation of the MLG 16 into the aircraft 10.

In one advantageous embodiment, the loader 60 is driven over the ground by a drive mechanism comprising six, synchronized, steerable, nine-inch dual-wheel assemblies 86, each equipped with an electric servo drive. This drive mechanism enables an operator of the loader 60 to precisely control the x and y positions of the loader, and hence, the MLG 16, relative to the wheel well 22 of the aircraft 10 from outside of the aircraft using, e.g., a control console located on the loader, or alternatively, a control "pendant," i.e., a control pad attached to the loader by an electric cord (preferably, one which is UL rated for Class 1, Division 2, i.e., a flight line environment), or alternatively, by a wireless RF connection. As those of skill in the art will appreciate, the drive mechanism also provides the loader with an additional degree of rotational control, namely, the ability to rotate in the horizontal plane ("$\Theta_z$"), i.e., about the vertical z axis. The total weight of the MLG loader 60, including the MLG 16, can be distributed uniformly over the wheel assemblies 68 of the drive mechanism such that the bearing weight of the fully burdened loader 60 does not exceed a rated floor load of 450 PSI. In the particular example embodiment of the loader 60 illustrated in the figures, the total weight of the loader is about 26,000 lbs., and its overall dimensions are 190 inches long×194 inches wide×120 inches high, but as those of some skill in this art will appreciate, these parameters can be adjusted in accordance with the particular application at hand.

In one advantageous embodiment, the MLG loader 60 is provided with a pair of battery carts 88 (see FIGS. 8 and 12) that respectively attach to the back end of each of the right- and left-hand L-shaped half-units 62L and 62R of the loader. The battery carts 88 serve to power the electric motors 80, 81 of the jacks 68L, 68R, 70L, 70R and the slide mechanisms 76, as well as the variable frequency drive wheels 86 of the loader 60. Each of the battery carts 88 can be replaced with a backup battery cart when recharging is necessary. The battery carts, like the control pendant described above, are preferably designed to meet UL requirements for Class 1, Division 1 and 2, while operating in the vicinity of a fueled aircraft, and enable the loader 60 to move freely along the assembly line for up to eight hours without recharging. However, if desired, a secondary power source, such as an electric extension cord or a generator cart (not illustrated), can be used for redundancy.

FIG. 12 illustrates an optional mechanism 90 that can be used advantageously in conjunction with the exemplary loader 60 of the present disclosure. The mechanism 90, a strut/truck MLG drive assembly, comprises a ball-screw linear actuator 92 having an electric motor and-C face brake attached. A ball-screw worm drive mounting plate 94 is connected to a fitting on the truck 24 of the MLG 16, and an attachment fitting 96 is located at the opposite end of the actuator 92 and connects to the strut 18 by means of a bushing that enables the strut to rotate freely about the long axis of the strut in either direction relative to the truck 24 without binding when the drive assembly 90 is actuated. This angular adjustment of the strut 18 relative to the truck 24 can be accomplished using the same control pendant discussed above that controls the movements of the loader 60 and its MLG 16 manipulation features. In use, the mechanism 90 enables the strut 18 of the MLG 16, and in particular, fittings at the upper end 20 thereof, to be rotated relative to the truck 24 of the MLG 16 and thereby enable a fine positioning of the fittings with respect to associated structures in the wheel well 22 during the marriage of the MLG to the aircraft 10.

The method used for attaching the exemplary loader 60 of the present disclosure to the MLG 16, and thence, the MLG to the aircraft 10, is as follows. The MLG 16 is initially conveyed to the location of the loader 60, e.g., with a forklift (not illustrated), with the shipping fixture 50 already coupled to the wheels 26 of the MLG truck 24, as illustrated in FIG. 5B. In one embodiment, the two L-shaped half-units 62L and 62R of the loader 60 are then moved laterally toward each other across the sagittal plane of the MLG 16 until the respective mouths 53 of the two elongated couplers 52 of the slide assemblies 76 respectively engage over opposite ends of the transverse beams 54 of the coupling fixture 50. The two L-shaped units 62L and 62 R are then locked together such that the slide mechanisms 76, together with the fixture 50, define a single platform coupled to the MLG 16 that can be raised, lowered, horizontally traversed, and rotated about two axes of rotation, through control of the loader.

In an alternative embodiment, the two L-shaped units 62L and 62 R may be locked together initially, and the four jacks 70L, 70R, 68L and 68R used to move the two slide mechanisms 76 up in concert and over the top of the coupling fixture 50, such that the sliding members 76R and 76F of the slide mechanisms 76 are centered over the fixture 50. The respective sliding members 76L and 76R of the slide mechanisms 76, which are attached to respective ones of the elongated couplers 52, are then lowered so as to line up with respective ones of the transverse beams 54 of the fixture 50 and moved forward so as to engage and receive the respective opposite ends of the transverse beams 54 of the fixture 50 simultaneously within the respective C-shaped mouths 53 of the elongated couplers 52 (see FIGS. 6 and 7). The four jacks 70L, 70R, 68L and 68R, acting in concert, then move the couplers 52 up, thereby preloading the transverse beams 54 of the coupling fixture 50. Then, using hand cranks (not illustrated) respectively disposed on the tops of the couplers 52, the couplers are fastened firmly to the ends of the trans-verse beams of the fixture 50. This method prevents the MLG 16 from moving during its installation onto the loader 60.

The operator of the loader 60, while positioned, for example, aboard the loader on one of the work platforms 84 thereof, or at a location remote from the loader, can then steer the loader and MLG 16 into position under the wing of the aircraft 10 at the position of the desired well 22, and using the loader control pendant, manipulate the MLG up into the wheel well without causing any interference between the MLG and the airplane wing or any auxiliary working or support stands that provide access and/or support of the airplane on the moving assembly line.

By now, those of skill in this art will appreciate that many modifications, substitutions and variations can be made in and to the materials, apparatus, configurations and methods of MLG loader of the present disclosure without departing from its spirit and scope. For example, in an appropriate situation, hydraulic linear actuators can be substituted for one or more of the electrical ball-screw linear actuators illustrated and described herein. Accordingly, the scope of the present disclosure should not be limited to that of the particular embodiments illustrated and described herein, as they are only exemplary in nature, but rather, should be fully commensurate with that of the claims appended hereafter and their functional equivalents.

What is claimed is:

1. Apparatus for loading and unloading a main landing gear ("MLG") of an aircraft, comprising:
    a fixture adapted to couple to a truck of the MLG such that a sagittal plane of the fixture is parallel to or coplanar with a sagittal plane of the MLG, both translational forces and turning moments applied to the fixture are coupled directly through the fixture to the MLG;
    a mechanism for controllably translating the fixture in the sagittal plane thereof, wherein the mechanism comprises:
        a support frame having opposing portions disposed on opposite sides of the fixture;
        a pair of opposing slide mechanisms, each coupled to a corresponding opposite side of the fixture and supported on a corresponding one of the support frame side portions for simultaneous, coextensive sliding movement in a plane parallel to the sagittal plane of the fixture and relative to the support frame; and,
        a mechanism for urging the slide mechanisms in simultaneous, coextensive translational movement; and,
    a mechanism for controllably rotating the fixture in the sagittal plane thereof.

2. The apparatus of claim 1, wherein the urging mechanism comprises a ball-screw or a hydraulic linear actuator.

3. The apparatus of claim 1, wherein the mechanism for controllably rotating the fixture in the sagittal plane thereof comprises:
    first and second pairs of opposing vertical jacks, each pair having a jack supported on a corresponding one of the support frame side portions, the first pair being fixed relative to the support frame and the second pair being axially moveable on the support frame relative to the first pair;
    a pair of foot-blocks disposed on each slide mechanism and rotatably coupling corresponding opposite end portions of each slide mechanism to an output end of a corresponding one of the jacks of each of the first and second pairs of jacks; and,
    a mechanism for controllably raising and lowering the output ends of the jacks of each opposing pair of jacks simultaneously, coextensively and independently of the output ends of the other pair.

4. The apparatus of claim 3, wherein the raising and lowering mechanism comprises a ball-screw or a hydraulic linear actuator.

5. The apparatus of claim 1, further comprising a mechanism for controllably rotating and translating the fixture in a horizontal plane.

6. The apparatus of claim 5, wherein the mechanism for controllably rotating and translating the fixture in the horizontal plane comprises a drive mechanism coupled to the support frame, the drive mechanism including a plurality of synchronized, steerable wheels, each equipped with an independently controllable servo drive mechanism.

7. The apparatus of claim 1, further comprising a mechanism for rotating a strut of the MLG about a central axis of the MLG and relative to the truck of the MLG.

8. The apparatus of claim 7, wherein the strut rotating mechanism comprises a ball-screw or a hydraulic linear actuator adapted to couple between the strut and the truck.

9. A method for loading a main landing gear ("MLG") of an aircraft, the method comprising:
    coupling a fixture to a truck of the MLG such that both translational forces and turning moments applied to the fixture are coupled through the fixture directly to the MLG;
    controllably translating the fixture in at least one of a horizontal plane and a sagittal plane of the MLG until an upper end of a strut of the MLG is aligned with a wheel well of the aircraft, wherein controllably translating the comprises:
        coupling a pair of slide mechanisms to the fixture on opposite sides of the sagittal plane; and,
        urging the two slide mechanisms in a simultaneous, coextensive translational movement parallel to the sagittal plane; and
    controllably rotating the fixture in at least one of the sagittal plane and a horizontal plane until the upper end of the strut is disposed within the wheel well.

10. The method of claim 9, wherein:
    the truck includes a plurality of wheels; and,
    coupling the fixture to the truck of the MLG comprises coupling the fixture to the wheels of the truck.

11. The method of claim 9, wherein controllably rotating the fixture comprises:
    coupling a pair of slide mechanisms to the fixture on opposite sides of the sagittal plane, each slide mechanism having opposite ends; and,
    raising and lowering an opposing pair of the opposite ends of the slide mechanisms simultaneously and coextensively relative to the other opposing pair of opposite ends thereof.

12. The method of claim 9, wherein controllably translating the fixture further comprises:
    supporting the fixture on a support frame having a drive mechanism coupled thereto, the drive mechanism including a plurality of synchronizable, steerable wheels, each equipped with an independently controllable servo drive mechanism; and,
    controllably translating the support frame in the horizontal plane using the drive mechanism.

13. The method of claim 9, wherein controllably rotating the fixture further comprises:
   supporting the fixture on a support frame having a drive mechanism coupled thereto, the drive mechanism including a plurality of synchronizable, steerable wheels, each equipped with an independently controllable servo drive mechanism; and,
   controllably rotating the support frame in the horizontal plane using the drive mechanism.

14. The method of claim 9, wherein the MLG comprises an elongated strut having a central axis, and further comprising rotating the strut about the central axis and relative to the truck.

15. An aircraft main landing gear ("MLG") loader, comprising:
   a U-shaped support frame comprising two symmetrical, L-shaped half-units disposed in opposition to each other on opposite sides of a sagittal plane thereof;
   two pairs of opposing vertical jacks, each pair including a jack having a base end supported on a corresponding one of the opposing support frame half-portions and an opposite output end vertically extendable and retractable relative to the base end, and wherein a first pair of the jacks is fixed relative to the support frame and a second pair is horizontally moveable on the support frame relative to the first pair;
   a mechanism for controllably extending and retracting the output ends of the jacks in each opposing pair of jacks simultaneously, coextensively and independently of the output ends of the other pair of jacks;
   a pair of slide mechanisms, each having a pair of sliding members slidably disposed thereon and an associated pair of foot-blocks coupled thereto, each foot-block mechanism rotatably coupling a corresponding opposite end portion of the associated slide mechanism to a corresponding one of the output ends of the jacks;
   a pair of mechanisms for respectively urging the sliding members of the slide mechanisms in simultaneous, coextensive translational movement relative to the support frame and parallel to the sagittal plane; and,
   a mechanism for coupling both axial forces and turning moments applied to the sliding members of the slide mechanisms to the MLG.

16. The loader of claim 15, wherein the coupling mechanism comprises a fixture adapted to be coupled to wheels of a truck of the MLG.

17. The loader of claim 15, wherein at least one of the urging mechanisms and the extending and retracting mechanisms comprises a ball-screw mechanism or a hydraulic linear actuator.

18. The loader of claim 15, wherein the support frame is supported on a drive mechanism that includes a plurality of synchronizable, steerable wheels, each equipped with an independently controllable servo drive mechanism.

19. The loader of claim 15, further comprising a linear actuator adapted to be coupled between a strut of the MLG and a truck of the MLG and operable to rotate the strut about a central axis of the strut and relative to the truck.

20. The loader of claim 19, wherein the actuator comprises an electromechanical or a hydraulic linear actuator.

21. The loader of claim 15, further comprising means for remotely controlling operation of the loader.

22. The loader of claim 15, further comprising means for locking the two L-shaped half-units of the support frame to each other across the sagittal plane.

23. The loader of claim 15, further comprising at least one battery cart electrically coupled to at least one of the L-shaped half-units of the support frame.

* * * * *